United States Patent
Scott et al.

(10) Patent No.: US 8,447,188 B2
(45) Date of Patent: May 21, 2013

(54) DYNAMIC OPTICAL REFLECTOR AND INTERROGATION SYSTEM

(75) Inventors: Andrew M Scott, Malvern Worcs (GB); Keith L Lewis, Malvern Worcs (GB); Mark E McNie, Malvern Worcs (GB); Kevin M Brunson, Malvern Worcs (GB); David J Jackson, Malvern Worcs (GB); Kevin D Ridley, Malvern Worcs (GB)

(73) Assignee: Qinetiq Limited, Farnborough, Hants (GB)

( * ) Notice: Subject to any disclaimer, the term of this patent is extended or adjusted under 35 U.S.C. 154(b) by 1962 days.

(21) Appl. No.: 10/483,738

(22) Filed: May 6, 2004

(65) Prior Publication Data
US 2006/0215147 A1    Sep. 28, 2006

(30) Foreign Application Priority Data
May 7, 2003   (GB) .................................. 0310451.0

(51) Int. Cl.
*H04B 10/00*   (2006.01)

(52) U.S. Cl.
USPC .......................................... 398/169; 398/170

(58) Field of Classification Search
USPC .................. 359/238, 278, 260, 263; 398/169, 398/170
See application file for complete search history.

(56) References Cited

U.S. PATENT DOCUMENTS

| | | | |
|---|---|---|---|
| 4,134,008 A | | 1/1979 | de Corlieu et al. |
| 4,209,689 A | * | 6/1980 | Linford et al. ................ 398/157 |
| 4,866,781 A | * | 9/1989 | Borken et al. ................ 382/103 |
| 5,253,099 A | * | 10/1993 | Heidemann .................... 359/260 |
| 5,355,241 A | * | 10/1994 | Kelley .......................... 398/170 |
| 5,819,164 A | * | 10/1998 | Sun et al. ...................... 455/106 |
| 6,721,539 B1 | * | 4/2004 | O'Brien et al. .............. 455/41.1 |
| 6,747,741 B1 | * | 6/2004 | Kleinschmidt ................ 356/454 |
| 6,778,779 B1 | * | 8/2004 | Shay et al. ..................... 398/41 |
| 2003/0021303 A1 | * | 1/2003 | Daiber .......................... 372/20 |

FOREIGN PATENT DOCUMENTS

| | | | |
|---|---|---|---|
| GB | 2196809 | * | 5/1998 |
| WO | WO 98/35328 | | 8/1998 |
| WO | WO 99/59271 | | 11/1999 |

\* cited by examiner

*Primary Examiner* — Mark Hellner
(74) *Attorney, Agent, or Firm* — Nixon & Vanderhye P.C.

(57) ABSTRACT

A retro-reflective identification tag capable of modulating an optical signal whereby to support bi-directional communication with an associated remote optical interrogation device. The tag comprises a MOEMS modulating layer over a retro-reflective substrate, giving the tag a wide angle of effective operation. The tag modulator may optionally be switched on only responsive to detection of a precursor beam from the interrogation system in order to save power. The interrogation device may make use of multiple optical wavelengths for communicating with the tag.

11 Claims, 4 Drawing Sheets

Fig.2a.

Transmittance (%) vs Wavelength (μm)

Fig.2b.

Transmittance (%) vs Angle (deg)

Fig.3.

Transmittance (%) vs Angle (deg)

DYNAMIC OPTICAL REFLECTOR AND INTERROGATION SYSTEM

FIELD OF THE INVENTION

The present invention relates to apparatus, methods, signals, and other associated aspects relating to optical reflectors which can be remotely interrogated, along with systems incorporating the same. The present invention relates particularly to optical reflectors arranged to reflect, modulate, and filter incident light.

BACKGROUND TO THE INVENTION

It is known to provide dynamic optical tagging systems based on a number of different technologies. Such tags have a wide variety of applications including, for example, identification and/or tracking of vehicles (road tolling), equipment (cargo container tracking), or people and in access control systems (for example in employee identification badges used to control access to specific areas). Such applications include both military and civilian use.

Known tagging systems have in common the basic concept of utilising a compact optically reflective tag which may be affixed, for example, to a vehicle, device, or person, etc. The tag may then be illuminated by means of a remote laser light source (preferably operating at a power and a wavelength which is not damaging to eyesight). Light reflected from tags in the area of illumination may then be detecting by means of a suitable optical detector and subsequently analysed so as to identify the location and possibly other information associated with those tags. Specific tag designs vary, and each has associated limitations.

Such tags may also incorporate the ability to modulate the reflected light so as to further identify the tag, or convey other information according to the complexity of programming of the tag. A number of ways is known to provide such modulation.

In particular U.S. Pat. No. 6,519,073 "Micromechanical Modulator and Methods for Fabricating the Same" (K. W. Goosen) and U.S. Pat. No. 5,500,761 "Micromechanical Modulator" (K. W. Goosen) disclose surface-normal micromechanical optical modulators. These modulators are arranged to reflect and modulate specific wavelengths only in a direction substantially normal to the surface of the device. Incident light arriving from a direction other than the normal to the surface of the device, will be reflected in a direction different from that of arrival. Furthermore, the wavelength of the light passed by such modulators varies as the angle of incidence deviates from the normal owing to the increase in optical path length within the device itself. For these reasons at least, such devices are in general not suitable for use as general purpose identification tags, particularly in situations in which an interrogating light source and detector may be arbitrarily located relative to the light-receiving surface of the tag.

Other known dynamic optical tags for such applications are based on a number of concepts based on optically switched retro-reflectors exploiting technologies such as liquid crystal and multiple quantum well modulators. Another approach utilises micro electromechanical corner cube retro-reflectors, the reflected signal being modulated by deforming the corner cubes which are fabricated using silicon microsystems. However, such techniques are unable to provide reliable communication links at data rates in excess of 50 kbps over a wide range of operating temperatures and the devices themselves costly to manufacture. Furthermore at ranges of, for example, 10 km between light source and reflector, calculations indicate that the diffuse return from background objects will be of a magnitude similar to that of any returns from such retro-reflectors. These returns act as a significant source of noise in the detection and interrogation process, thereby limiting both the effective data rate and the useful range of the devices.

A further disadvantage of known tags, especially those utilising liquid crystal components or multiple quantum well (MQW) components, is that their effective operating temperature range is undesirably limited. Consequently, in order to support reliable operation over a wide range to of temperatures, for example −40 C to +70 C, either explicit temperature stabilisation mechanisms are required, or the interrogator must be widely tunable in order to surmount the band-edge of the MQW material with ambient temperature.

Known tags based on combinations of refractive or diffractive mirrors or lenses also suffer from a restricted effective field of view which can make remote interrogation difficult.

OBJECT OF THE INVENTION

The present invention seeks to provide apparatus, methods, signals, and other associated aspects relating to optical reflectors which can be remotely interrogated, and systems incorporating the same, and which mitigate one or more problems associated with the prior art.

SUMMARY OF THE INVENTION

This invention provides a compact dynamic optical tag and free-space optical communication system for data transmission between the tag and remote laser interrogator. The interrogation system incorporates an optical tracker which can be used to locate the tag autonomously at ranges of up to 10 km and to maintain effective communication channels over a wide range of approach geometries.

According to a first aspect of the present invention there is provided a modulator for modulating an optical signal, the modulator comprising a spacing-controllable etalon and a retro-reflector arranged to retro-reflect light received via the etalon back through the etalon.

Advantageously, light incident upon the arrangement is substantially reflected back towards its source whilst at the same time being filtered by the action of the etalon.

Furthermore, by providing a construction which avoids use of liquid crystal components and multiple quantum well structures, the effective operating temperature range (without the need for temperature stabilisation mechanisms) of the device is greatly enhanced. Consequently, overall power consumption requirements for the device are also reduced. In addition, the modulator is able to operate effectively over a wide field of view of approximately 120°.

Preferably, the etalon comprises a coherent planar MOEMS structure.

Advantageously, the structure allows fast operation of the modulator leading to high data transfer rates.

Preferably, the retro-reflector comprises an array of one or more corner-cube reflectors.

Advantageously, corner cubes arrays are well known, reliable, durable, and relatively easy to produce at low cost with predictable reflective characteristics.

Preferably, modulator is arranged to be modulated at a fixed frequency.

Advantageously, the viewing angle associated with reflected light at a specific wavelength is enhanced. The wavelength reflected is determined by the internal optical path length and, by modulating the MOEMS membrane over a predetermined range, the path length over a wide range of viewing angles can be made to traverse the required path length at some point in the modulation.

Preferably, the cavities in the etalon are vacuum cavities.

Advantageously, this avoids the damping effect on the MOEMS membrane of air/gas in the cavities.

Preferably, the modulator comprises a self-contained electrical power supply.

Advantageously, such a modulator may be used without the need to couple it, in use, to an external source of electrical power. Such self-contained power supplies include, but are not limited to, electrical power cells, solar power units, etc.

According to a further aspect of the present invention there is provided optical detector arrangement comprising a plurality of photo-detectors with associated means for restricting the light acceptance angle, the means being so arranged as to allow determination, based on outputs from the photo-detectors, of a direction of incidence of light from a remote source.

Advantageously, the detector arrangement may be used to provide an initial indication of the relative position of a source of laser light directed towards a tag comprising such a detector.

The invention is also directed to a reflective tag comprising one or more modulators according to the first aspect.

Advantageously, the divergence of transmitted light is not limited by the size of a single MOEMS element, but by the size of the separate retro-reflective aperture. This construction allows the tag to overcome the limitations associated with a single MOEMS mirror.

The reflective tag may comprise a detector arrangement coupled to the modulator.

Advantageously, the modulator may be operated responsive to detection of an incoming optical signal.

Preferably, detection of a precursor signal causes the modulator to be activated.

Advantageously, power may be conserved while the tag is not being interrogated. The precursor signal may carry timing information which may be used to predict when the interrogator signal for activated a predetermined time interval after receipt of the incoming wake-up" signal, and not necessarily instantaneously.

Advantageously, the stable dynamic behaviour of a modulator which has only two stable spacings may be exploited by activating the modulator a predetermined time interval before the interrogation pulse arrives. In this way the modulator can be at a precisely predicted intermediate position when the interrogation pulse arrives. This overcomes the fact that the optimum spacing of the modulator varies with angle of incidence on the tag.

Advantageously, the tag will be fully activated by the precursor tag and ready to respond when the interrogator beam strikes the tag during the search phase.

Preferably, the reflective tag comprises attachment means.

Advantageously, such a tag may be readily attached to an item to be tracked. Such attachment means includes, but is not limited to, self-adhesive means, hook-fastening means (e.g. Velcro®), or clip means.

According to a further aspect of the present invention there is provided an optical interrogator for use with a reflective optical tag, the interrogator comprising a laser source of light at two distinct wavelengths which are reflected by the tag substantially in anti-phase one with the other.

Advantageously, by taking the returns from both lasers into account, the signal-to-noise ratio of the signal received from the tag at the interrogator is greatly improved relative to system employing only a single interrogation wavelength. The interrogator comprises two detectors, one for each wavelength.

The interrogator source of light may comprise two laser sources.

The interrogator may also comprise a detector arranged to receive reflected light emitted from the interrogator.

The interrogator may also comprise an erbium filter arranged to discriminate between light at the two distinct wavelengths.

According to a further aspect of the present invention there is provided a remote optical interrogation system comprising an optical interrogator.

The remote interrogation system may comprise at least one modulator arrangement or reflective tag according to the present invention.

According to a further aspect of the present invention there is provided a modulator for an optical signal substantially as described in the foregoing description or with reference to the accompanying drawings.

According to a further aspect of the present invention there is provided a optical detector arrangement substantially as described in the foregoing description or with reference to the accompanying drawings.

According to a further aspect of the present invention there is provided a optical remote interrogation system substantially as described in the foregoing description or with reference to the accompanying drawings.

According to a further aspect of the present invention there is provided a reflective tag comprising an etalon and a retro-reflector arranged to retro-reflect light received via the etalon back through the etalon.

According to a further aspect of the present invention there is provided a modulator according comprising an input or output port for local communication.

The invention also provides for a system for the purposes of optical communications which comprises one or more instances of apparatus embodying the present invention, together with other additional apparatus.

The invention is also directed to methods by which the described apparatus operates and including method steps for carrying out every function of the apparatus.

The invention further provides for programs for computers (optionally on a machine-readable carrier) arranged, in operation, to control and/or carry out functions of the apparatus and/or methods and including software used to define circuitry utilised in implementing the apparatus or methods.

The invention is also directed to special signals employed by the apparatus, methods, and programs.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Figure 1:
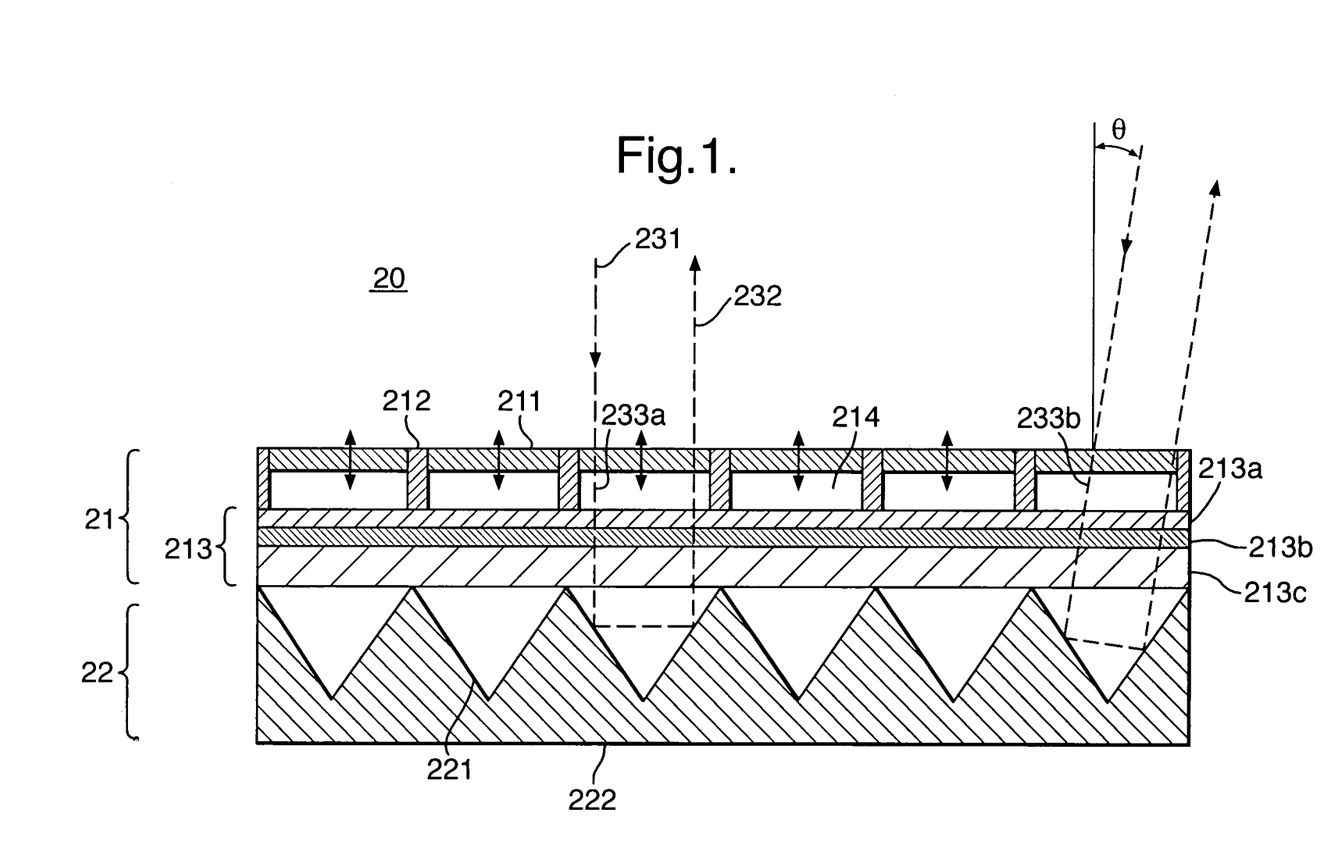
FIG. 1 shows a schematic diagram of a cross-section though a device according to one embodiment of the present invention.

Referring to FIG. 1, the basis of the invention lies in an optical device 20 which combines an optical modulator 21 (for example a MOEMS modulator) with a retro-reflector 22 (for example a micro-corner cube array). The modulator may be a tunable Fabry Perot etalon 21 which acts as a wavelength-selectable shutter, controlling the degree to which laser radiation 231 is admitted to the individual retro-reflecting elements 221.

The etalon comprises a composite membrane 211, a silicon wafer 213 (comprising multiple layers 213a-c), and electrostatically-driven elements 212 arranged to vary the separation between the membrane 211 and the wafer 213 which may comprise multiple layers 213a-c. Together these components define internal cavities 214 which may be air- or gas-filled cavities or, more preferably, vacuum cavities so as to avoid the damping effects of air/gas and to ensure acceptable phase shifts can be produced at high frequencies.

The membrane may itself comprise multiple layers, or may comprise multiple micro-mirrors suspended (for example by micro-springs) over the cavities.

Figure 2A:
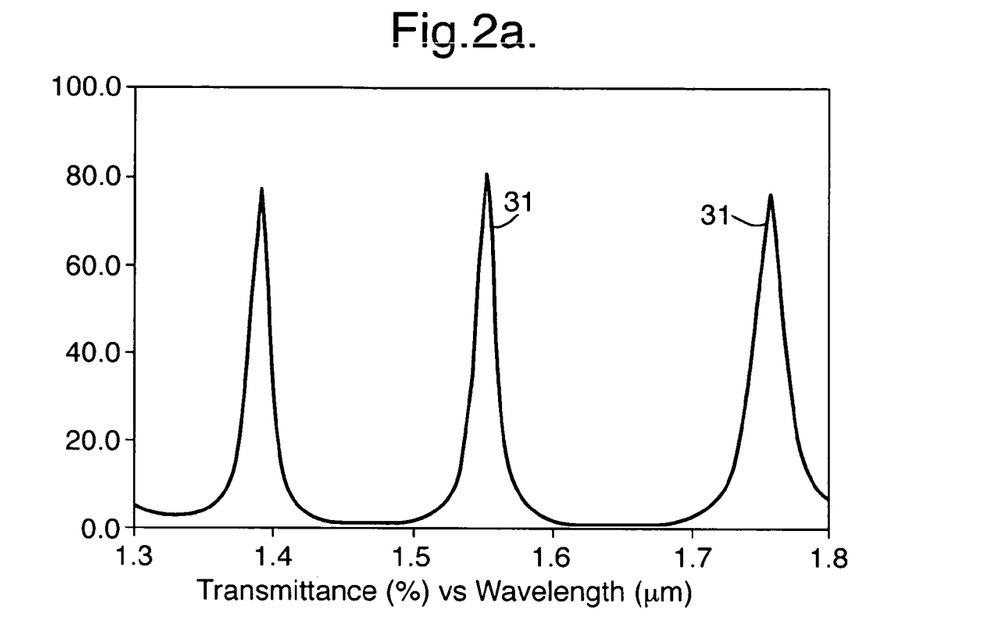
FIG. 2(a) shows an example of a transmission spectrum associated with a device according to the present invention.

The gap between the composite membrane and the underlying silicon wafer forms a Fabry-Perot interferometer with sharp resonances 31 as shown in FIG. 2(a). The width of the resonances can be controlled by suitable design of the membrane layer structure. The exact wavelengths at which the resonance bands in such a device occur are determined by the choice of thickness of the gap and can be varied by moving the composite membrane under electrostatic control.

A buried oxide film 213b is exploited as a component of the optical stack, and together with a single membrane element 211—which is a multiple of an odd number of quarter waves in thickness—provides for switching contrast levels of about 98% for a single pass. Since the retro-reflection configuration provides for a double pass of light incident light through the etalon, the resulting switching contrast achievable is in excess of three orders of magnitude.

Alternative embodiment with different structure utilising different layer thicknesses gives contrast levels closer to 90%, but with broader resonances. This leads to switching contrasts of in the order of two orders of magnitude which is adequate for many purposes and which will function over a wider range of angles of incidence.

The corner cube array 22 may be a standard commercial all-polymer material, such as that available from Reflexite®. Planar polymer retroreflector arrays from Reflexite comprise moulded arrays of isosceles triangles, each triangle being the apex of a corner cube retroreflector. Inspection of a corner cube reveals a pattern of six triangles, corresponding to three mirrors meeting at the centre, each bisected to form two triangular sub apertures. Light incident on one half of a mirror experiences three reflections and emerges from the other half of the mirror aperture. The divergence of the reflected beam is limited by diffraction of the sub-aperture, where the aperture size is approximately one quarter of the corner cube aperture itself. A corner cube with a sub-aperture dimension of 140 micron produces a diffraction limited retro-reflection cone angle of 2 degrees at 1.5 micron. Commercial grade material from Reflexite® provide returns with a full angle of 0.5° when interrogated with 633 nm light, which scales to approximately 1.5 degrees at 1.5 micron. If it is necessary to reduce the retro cone angle of the tag because of the effects of clutter, this may be achieved by replacing conventional Reflexite material with a retro-reflector array having an aperture size of order 560 microns, in order to achieve a cone angle of 0.5 degree. This may be bonded to the MOEMS array 21 whose elements may be fabricated to correspond closely to the dimensions and form of the individual corner cube elements.

The presence of the etalon affects the divergence of the beam retro-reflected by the corner cube array. Fast Micro-Optical Electro-Mechanical Systems (MOEMS) devices require small apertures of order 20 microns with 2 micron boundaries, while the subapertures of the retro-reflector may be of order 40 microns (for 2 degree cone angle) or 160 microns (for 0.5 degree cone angle).

By ensuring the separate etalon apertures are sufficiently uniform, light transmitted through the separate MOEMS apertures is in phase with each other and the divergence is not restricted by the aperture of the individual etalon apertures. The 2 micron boundary structure for each element acts as a 'net mask' over the whole tag, and the diffraction pattern generated by the mask diffracts to a width of 20 microns over a distance of a few microns. This means there is no shadowing of one aperture by another, thereby avoiding Moiré and vignetting effects.

The fabrication processes required for the realisation of arrayed devices are very cost-effective, providing a key differentiator for industrial-scale manufacture. On that basis a preferred embodiment uses a moulded retro-reflective array 22 as the basis for the device, gating the individual corner cubes in the array using a bespoke electrostatically driven MEMS modulator 21.

In one embodiment the shift in the spectral characteristics of such a device with variation in angle of incidence, $\theta$, may be overcome by modulating the device at a fixed frequency. In this way a modulating return is provided over a wide range of angles of incidence, the precise range of angles being determined by the degree of variation in the internal light path caused by the modulation. Such arrangements may in principle achieve modulation rates of up to 1 MHz, thereby enabling data transfer at bandwidths up to or in excess of 50 Kbps if required. In this case information may be transferred form the tag by interrogating it with a continuous wave laser and using phase shift keying (PSK) to pass information. The data rate achievable in practice will be determined by trade-offs between laser power and divergence, range, atmospheric turbulence, and shot noise. The modulation may be achieved by electrostatically deflecting 212 the upper etalon surface 211.

Referring now to FIG. 2(a), the spectral characteristics of a MEMS filter with a single buried oxide layer 213b and a single silicon membrane element 211 indicate that, despite the use of so few components in the device, the degree of contrast 31 around the cavity resonance is significant. The example illustrated is centred around the use of 1.55 μm for the communicating wavelength for a device based on the layer sequence substrate/SiO2/Si/air/Si, where the substrate is silicon and the air gap is 8 half waves in thickness.

Figure 2B:
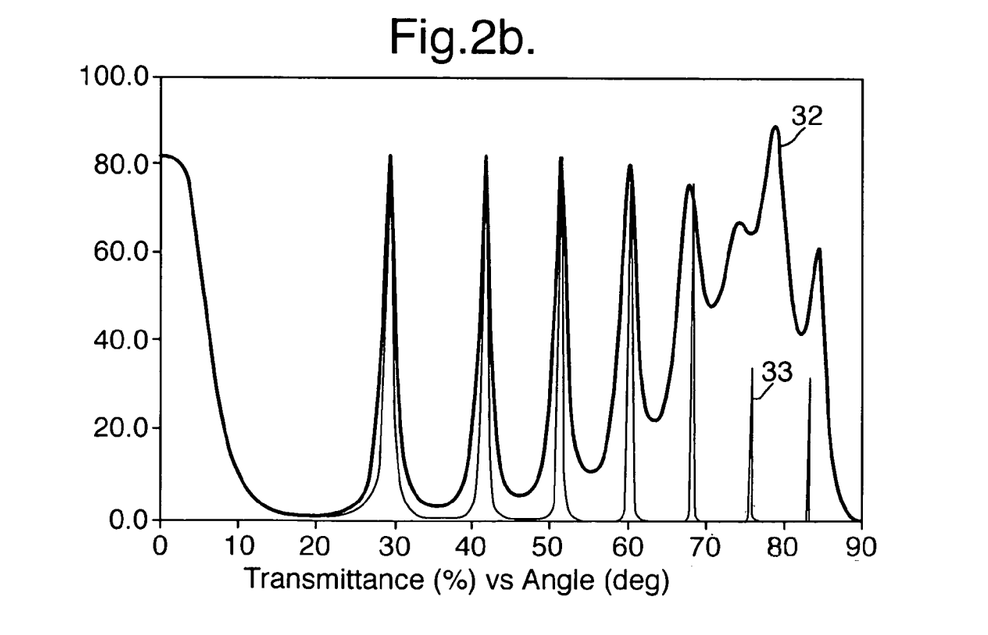
FIG. 2(b) shows an example of variation of transmission characteristics versus angle of incidence associated with a modulator according to the present invention.

Referring now to FIG. 2(b), the shift in spectral characteristics of such a device with variation in angle of incidence clearly highlights how higher cavity orders move into the spectral region of interest. Data is plotted for both s-polarisation 33 and p-polarisation 32. The results indicate that there could be difficulty in establishing communication links with such a device in situations in which the user had no control over the angle of incidence.

However, the present inventors have recognised that in one mode of operation this effect may be overcome by operating the device by modulating it at a fixed frequency, so that a modulated return is in fact provided at all angles of incidence over a wide angular range (for example, 120°). Time-division modulation or frequency modulation of the reflected signal may then be exploited as a way of impressing a data signal on the reflected light thereby enabling the passing of data between the tag and its interrogator. Based on data presented in U.S. Pat. No. 6,519,073 (cited above) it is possible to achieve modulation rates of up to about 1 MHz, thus enabling data transfer at rates up to and in excess of 100 Kbps.

FIG. 2(b) also indicates that the MEMS devices have a significant polarisation signature at angles of incidence above 30° or thereabouts. This characteristic can however be used as a search aid in distinguishing the reflectors from naturally occurring surfaces in the field, which are not likely to exhibit such linear polarisation effects.

Figure 3:
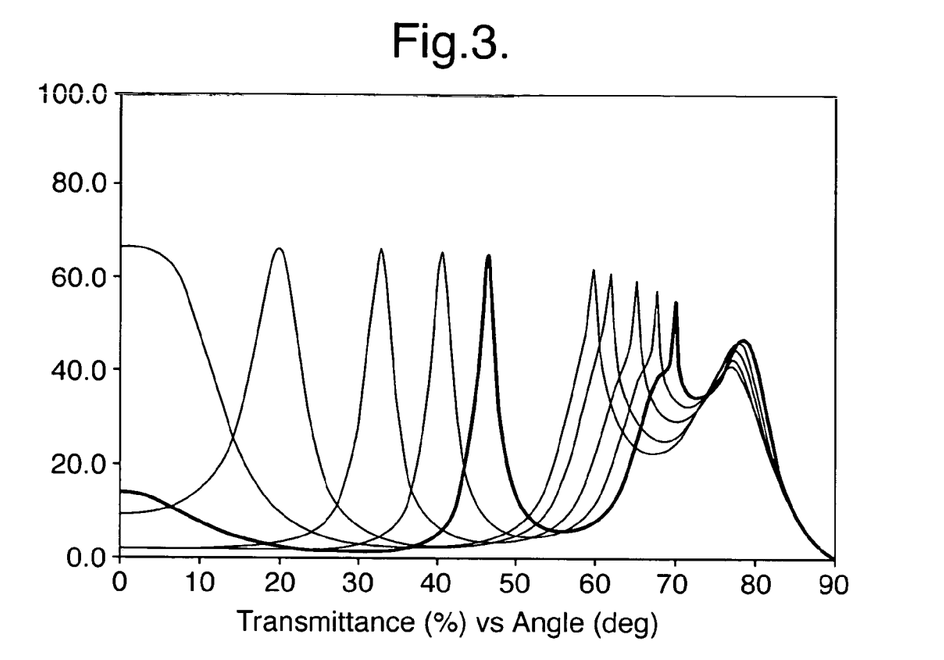
FIG. 3 shows an example of how transmission characteristics vary with angle for various etalon spacings in accordance to the present invention.

FIG. 3 shows how the transmission characteristics of the filter vary with angle for various spacings of the etalon. The curves plotted are averages for both s and p polarisation components in FIG. 2(b). In addition, the response to the light is strongly polarisation sensitive. This implies that if a random or linear polarisation is used for the interrogator, then the response will depend on the random orientation of the tag axis with respect to the laser polarisation as well as the angle of incidence. In order to avoid this, the interrogator beam is circularly polarised, so that there are always equal intensities of both orthogonal linear polarisations incident on the tag. The modulated retroreflection will be polarised in some way depending on the angle of incidence on the tag. It is noted that if the interrogator system measures this polarisation it may be able to adapt (for example by position or laser wavelength) to optimise the communication link.

The angular dependence of a MEMS modulator depends on the design and separation of the etalon mirrors. However a tag design is proposed below which measures the angle of incidence and can adjust the drive parameters to optimise response of the modulator.

The device may be designed to switch between two positions, an undriven position and a position in which the mirror reaches the set end-stop. The dynamic response can be exploited for pseudo analogue performance in a pulsed regime. If a particular analogue spacing is required, and a fixed pulse repetition rate is used in the interrogating laser, it is possible to drive the etalon at a particular time before the interrogator pulse is expected to arrive. This may be achieved by use of an on-chip clock, and synchronisation to the interrogator pulse by reference to the tag detector. The MOEMS etalon spacing then passes through the correct value just as the interrogator pulse arrives.

Computing the peak solar flux (200 W/m2/μm) and mean laser flux incident on the tag detector, shows that for a filter of order 10 nm, the fluxes are very similar. Thus under some circumstances a tag could have difficulty in discriminating between the solar flux and a CW interrogator beam. In addition the full filtered solar flux would draw 10 times the detector dark current. By using a Q-switched laser, a peak laser power on the detector may be achieved which is 1000 times brighter than the solar flux. This means that one can choose to reduce the solar induced current to the level of the dark current using a neutral filter, and the pulsed interrogator beam is still sufficiently strong to be used as a handshake to activate the optical tag.

The pulsed interrogator beam also allows the MEMS device to synchronise the etalon drive to position the mirrors so that the maximum contrast is achieved at the time when the laser pulse is incident. This also improves the contrast compared with a continuous wave (CW) interrogator because the tag is only interrogated when the tag is optimised, so achieving giving a better signal-to-noise ratio.

Figure 4:
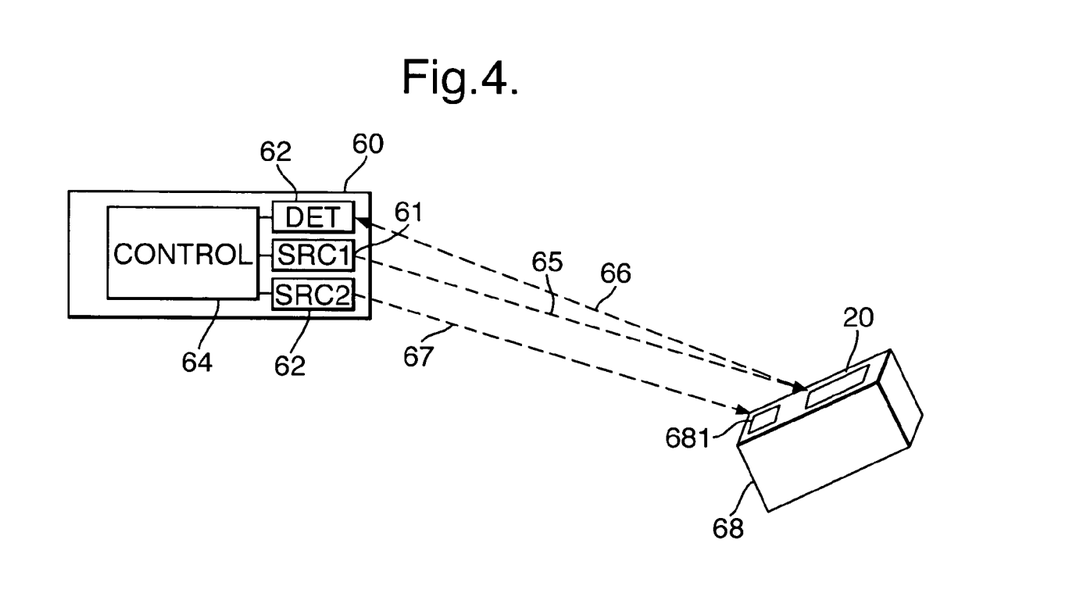
FIG. 4 shows a schematic diagram of an interrogation system according to the present invention.

Referring now to FIG. 4 there may be a need to determine the coarse angle of incidence to say 15 or 20 degrees accuracy. This can be achieved by having directional detector arrangement 681 capable of detecting an incident signal and determining its source angle to some degree of accuracy.

Figure 5:
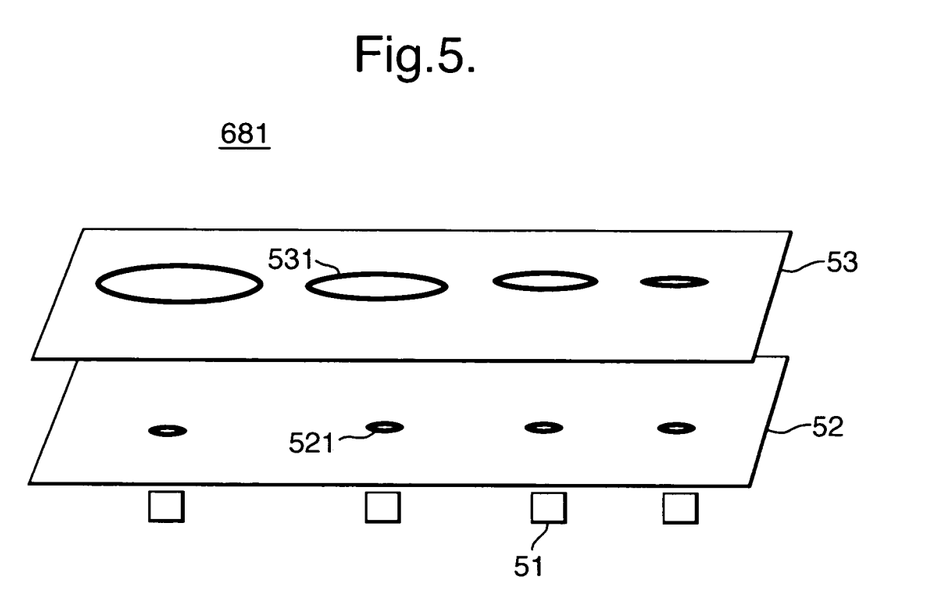
FIG. 5 shows a schematic diagram of an optical detector according to the present invention.

Referring now to FIG. 5 this can be achieved, for example, by use of a set of three or four detectors, each having a restricted acceptance angle. In the embodiment illustrated the detectors are each located in a pinhole camera structure. Each detector is located at a detection aperture 521—which is preferably circular—in a lower baffle 52. The input pinhole 531 in the upper baffle 53 may be a circular or an annular ring, so that each detector sees a small range of angles. Other structures, as would be apparent to a person skilled in art, would also suffice provided that they offer sufficient discrimination to derive a suitable measure of the angle of incidence. This arrangement allows use of simple, lost-cost electronics in the construction.

As regards power consumption of the detector, it is noted that the detector dark current is several orders of magnitude less than the amplifier/demodulator current. Power consumption could therefore be optimised by having all detectors initially coupled to a single amplifier, switching to a separate set of amplifiers only when an appropriate 'handshake' signal is detected.

Regarding power budget for the MOEMS device, for a 25 mm$^2$, it is noted that the array corresponds to a capacitor of area 5 cm$^2$ and depth of around 1 micron, corresponding to $10^{-9}$ F. For a drive voltage of 5V and time interval of $10^{-5}$ sec, the current drawn will be 0.5 mA. This leads to a current requirement of 1 mA hr to drive the modulator. If drive currents of 5V are utilised, the current requirement may be a factor 10 higher.

If the drive circuit takes longer to charge ready for operation (for example 1 ms or thereabouts) than the dwell time for the interrogator, a precursor 'wake-up' beam may be utilised which has an off-set from the main beam by some small angle. This beam scans ahead of the interrogator so that the wake-up beam arrives at the tag several milliseconds before the main beam, ensuring the tag can subsequently respond immediately to interrogation. The handshake may be recognised by simple timing circuit on the tag, which ensures the interrogating laser has the correct pulse separation time. In this way tags may selectively power up responsive to a characteristic (for example, pulse timing) of the wake-up source.

Regarding the associated tag interrogation system, the precise laser characteristics will vary according to application. The following embodiment addresses a scenario in which the interrogation system is airborne. Less stringent limitations may apply to other applications.

A lower limit on divergence is determined by the platform vibration, aero-optic effects, and search rate needs, whilst an upper value is determined by the fact that the signal to clutter ratio decreases with the square of the divergence angle. Consequently a divergence of 250 μrad, using a 10 W laser, is a realistic minimum value, though a higher power laser may be used. Haze and aerosol back-scattering of the laser beam and sunlight may add a veiling glare pedestal to the interrogator signal. Use of a Q-switched laser will allow the interrogator to discriminate between this and the retro signal by exploiting time gating principles. Solar flux on the tag detector is 2 W/m² when filtered by a 10 nm filter, which is the same level as the mean laser flux at 10 km. Use of a Q-switched laser also ensures that the instantaneous peak laser flux on the tag exceeds solar flux by 1000.

Commercially-available systems are available with outputs up to 250 kHz in 5 ns pulses, which is adequate for this purpose.

The divergence of 250 μrad leads to a spot size of 2.5 metres on the ground over a 10 km path.

In a first search strategy for locating a tag, the system can search for a passive return, dwelling on the tag for a period comparable with the time per bit (10-5 sec) before returning to the tag for a more detailed interrogation, having determined its positional co-ordinates in relation to GPS. This may be impractical unless one uses a separate laser looking for a strong retro-reflector which only reflects at the one wavelength.

An alternative strategy is for the system to dwell on the tag long enough to activate the device, detect the modulation, and possibly allow a small amount of information to be transferred 'on the fly' so that only selected tags are re-interrogated.

In the former case the search rate will be 1.7×103 km2/hr, while in the latter a dwell time of 160 μs (16 bits) will lead to a search rate of 100 km2/hr.

In a worst case, the tag may be located on a diffusely reflecting background (eg white sand), which will produce a diffuse reflection from the same range as the tag. The return will comprise a clutter signal backscattered by the diffuse background plus the retro-reflected signal from the tag. The size of a return from each is proportional to the illuminated area divided by the square of the retro-reflection cone angle. Inspection shows that the return detectable at 10 km from a 2.5 metre spot on a Lambertian background (i.e. light scatter uniformly over 180 degrees) is similar in magnitude to that from a 2.5 cm square tag with a cone angle of 2 degree. Calculations for a 2 degree retro-reflection cone angle indicate that the clutter return may be 30% larger than the tag signal, although if the retro-reflection cone angle can be reduced to 0.5 degree, then the clutter is a factor 5 smaller than the tag signal.

This indicates that the 'clutter only' signal may usefully be independently measured at the same time as the 'clutter plus tag return' signal to allow subtraction of the clutter background component. One approach for achieving this is to operate a laser at 200 kHz with the tag modulator switched to 'low retro-reflection mode' oily some (for example alternate) pulses, so that clutter returns are interleaved with the tag data signals, thereby achieving, for example, a 100 kHz data transfer rate. It is also noted that sequential pulses may illuminate slightly different spots on the ground, producing significantly differing clutter signals: even if the system is used in a stabilised 'communication' mode, vibration on the interrogator platform will lead to jittering of the spot position on the ground, and possibly fluctuations in clutter.

An alternative approach then is to measure the signal and clutter simultaneously. If this is attempted using two polarisation components then the polarisation signature of the tag will depend on the angle of incidence which is undesirable. At oblique angles, the tag will tend to modulate the 'p' polarisation and reject the 's' polarisation. Therefore a more reliable way of measuring the two signals simultaneously is to use a two-colour technique, using two laser wavelengths in conjunction with a tag which modulates either one wavelength only, or else modulates each wavelength in anti-phase.

The two-colour technique leads to two requirements. Firstly, the beam spatial profile of each should preferably be identical. Secondly, the two wavelengths of the interrogator should preferably be sufficiently close that the clutter signal and atmospheric transmission characteristics are substantially the same for each, but sufficiently different that they are modulated in different ways by the tag. This can be done either using a low cost filter at the tag to block one wavelength while transmitting the other, or setting the spacing of the etalon so that the two wavelengths are modulated out of phase. The first condition will be met by combining the two wavelengths in a single fibre amplifier before being launched. The second and third conditions will be met for most backgrounds if both wavelengths are from an Erbium laser, possibly using an Erbium absorption filter to block one of the wavelengths.

By fulfilling these conditions, the 'clutter' and 'signal plus clutter' channels for each bit can be recorded simultaneously and subtracted to obtain a signal. Using this configuration, with two lasers each operating at 10 W and 100 kHz, the signal-to-noise ratio (SNR) of the detection system can be calculated. For a retro-reflection cone angle of 2 degrees and a quantum efficiency of 1% it is possible to achieve a shot noise limited SNR of 4.5. For a retro-reflection angle of 0.5 degrees, the SNR is 12 (11 dB) for a quantum efficiency of 1%, and an SNR of 4 (6 dB) for a quantum efficiency of 0.1%.

Signal to noise ratios in the search phase can be improved further by using two (or possibly more) laser wavelengths within the 1.5-1.6 μm band. Such wavelengths may be chosen to provide an anti-phase relationship in relation to the spectral characteristics of the tag. In such an arrangement the transmitter of the interrogation system would comprise, for example, two laser light sources (for example erbium fibre lasers) to provide the source radiation. The corresponding receiver would typically, though not necessarily, be collocated with the transmitter and would incorporate a sensitive receiver for each wavelength channel with the receiver outputs being processed via a lock-in amplifier.

In search mode, the lasers would be arranged to scan the scene over a wide angle in order to locate and switch on any tags in the region scanned. Such tags would typically, though not necessarily, operate in a listen-only mode until activated in order to conserve battery power. Once activated, a tag would start to modulate the return, thereby facilitating rapid location of the tag in the field of view of the laser transmitter. This may then bring to bear the second optical channel within the interrogator, preferably with a narrower field of transmission, which would form the primary means of establishing formal communication, handshake, and data transfer.

Such a link could be operated in both directions, with digital memories within the tag being updated via the laser link and the detector 681 on the tag, or command signals transmitted to and from other sensors to which the tag may be connected.

The interrogator may be designed to be handheld, tripod mounted, or incorporated within a land, seaborne, or airborne vehicle as appropriate to the specific application. The tag could be maintained in the field of view of the receiver through the use of gimbaled optics (preferably automated), so compensating for any motion of either the interrogation apparatus or the tag.

As has been noted above, the interrogation system may utilise mature, eye-safe Erbium Doped Fibre Amplifier (EDFA) technology. The compact nature of such devices also enables the development of lightweight, power efficient laser interrogators. A first EDFA may operate at a wavelength around 1.530 μm, the other at approximately 1.605 μm.

Employing a dual wavelength interrogator offers at least the following distinct advantages:

- To aid the rapid acquisition of the tag an Erbium doped glass filter designed to provide very high extinction of one of the interrogator wavelengths can be employed. Thus when the search beam sweeps over the tag a very high contrast is achieved between the return at the two probe wavelengths, rapidly identifying the tag location.
- The MEMS device can be configured so that when it is modulated the retro-reflected signal at one wavelength will be varied but not at the other, thus dramatically increasing the signal-to-noise ratio of the link.

A depolarising layer can be added to the surface of the MEMS device to be effective when the angle of incidence approaches the limit of around 60 degrees from the normal. When the incoming light is close to Brewster's angle, the s-polarised component will be weakly reflected by the surface of the MEMS device and will always enter the retro-reflector and be retro-reflected, while the p polarisation will be strongly reflected and will not be modulated. By using a suitable depolarising layer, a compromise will be reached so that overall, there will be a variation in intensity for the overall retro-reflected signal, for all angles of incidence In summary then, the present invention exploits specific architectures for a reflective tag, together with a dual wavelength laser interrogation system, both to reduce background noise and to enable the use of hybrid wavelength modulation schemes for data transmission. This exploits the fact that two closely spaced wavelengths will have similar reflection coefficients from the diffuse background. By making the tag reflection wavelength dependent the system will discriminate against background noise.

Any range or device value given herein may be extended or altered without losing the effect sought, as will be apparent to the skilled person for an understanding of the teachings herein.

The invention claimed is:

1. A reflective tag comprising at least one modulator for modulating an optical signal, the modulator comprising:
    a spacing-controllable etalon; and
    a retro-reflector arranged to retro-reflect light received directly via the etalon back through the etalon.
2. A reflective tag according to claim 1 in which the etalon comprises a coherent planar MOEMS structure.
3. A reflective tag according to claim 1 in which the retro-reflector comprises an array of one or more corner-cube reflectors.
4. A reflective tag according to claim 1 arranged to be modulated at a fixed frequency.
5. A reflective tag according to claim 1 in which the cavities in the etalon are vacuum cavities.
6. A reflective tag according to claim 1 comprising a self-contained electrical power supply.
7. A reflective tag according to claim 1 comprising a detector arrangement coupled to the modulator.
8. A reflective tag according to claim 1 in which detection of a precursor signal causes the modulator to be activated.
9. A reflective tag according to claim 1 comprising attachment means.
10. A reflective tag according to claim 1 comprising an input or output port for local communication.
11. A reflective tag according to claim 1 wherein the etalon is located adjacent said retro-reflector.

* * * * *